Dec. 9, 1930. A. F. KRAEMER 1,784,451
CHAIN ASSEMBLY
Filed July 12, 1929
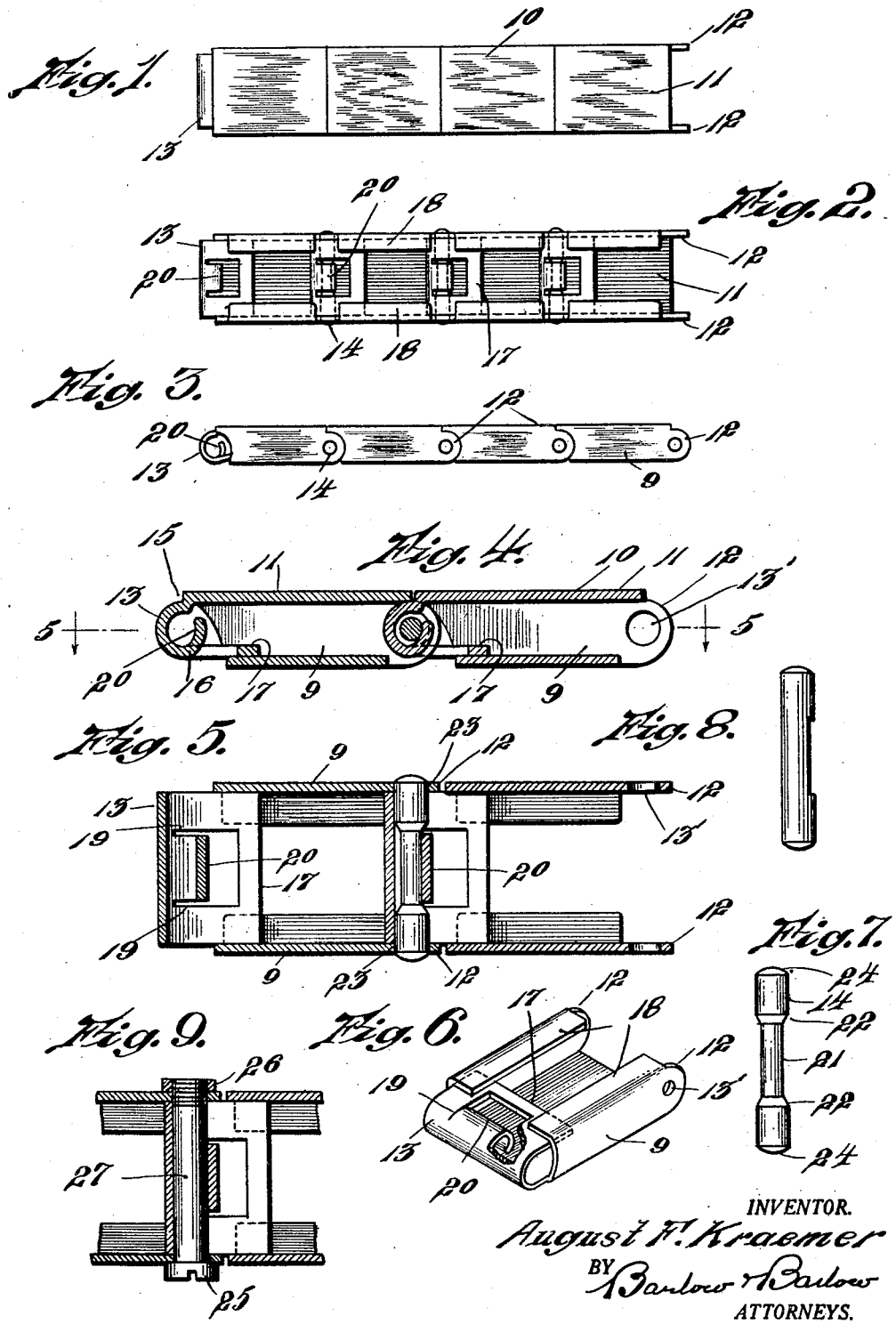
INVENTOR.
August F. Kraemer
BY Barlow & Barlow
ATTORNEYS.

Patented Dec. 9, 1930

1,784,451

UNITED STATES PATENT OFFICE

AUGUST F. KRAEMER, OF PROVIDENCE, RHODE ISLAND, ASSIGNOR TO LOUIS STERN COMPANY, OF PROVIDENCE, RHODE ISLAND, A CORPORATION OF RHODE ISLAND

CHAIN ASSEMBLY

Application filed July 12, 1929. Serial No. 377,738.

This invention relates to an improved construction of bracelet or chain, formed of a plurality of links pivotally connected together, and one of the objects of this invention is to connect together the links of the series with a pivot pin and to provide formations on the pin and on the links which will cooperate to releasably retain the pin in its operating position in the links. A further object of the invention is to form the end wall of the link with a resilient tongue folded in a loop shape to engage a recess formed in the pivot pin to retain the pin against inadvertent endways movement, the loop serving as a guide for the accurate inserting of the pivot pin into the links.

With these and other objects in view, the invention consists of certain novel features of construction, as will be more fully described, and particularly pointed out in the appended claims.

In the accompanying drawings:

Fig. 1 is a front view showing a series of links connected together.

Fig. 2 is a rear view of a series of links of the bracelet or chain pivotally connected together.

Fig. 3 is an edge view of the series of links shown in Figs. 1 and 2.

Fig. 4 is an enlarged sectional edge view showing a tongue as formed from the end wall of each link and engaging a recess in the pivot pin.

Fig. 5 is a sectional view on line 5—5 of Fig. 4 showing the pivot pin as recessed intermediate its ends and the resilient tongue of the link embracing this recessed portion of the pivot pin.

Fig. 6 is a perspective view of the under side of a box link having portions partly broken away to better show the spring tongue formed in the end wall of the link.

Fig. 7 shows the pivot pin in elevation as having its middle portion reduced in diameter.

Fig. 8 shows a modification in which the pivot pin is shown as being flattened on one side intermediate its ends.

Fig. 9 is another modification partly in section showing the pivot pin as having a head on one end and a nut threaded on its opposite end, and being embraced and guided at its middle portion by the tongue formed in the end wall of the link.

It is found in the construction of link chains or bracelets of advantage to employ a pivot pin for connecting together the ends of the links and so construct the parts that when the pin is forced into position it will be automatically retained without being obliged to apply additional fastenings to the pivot in order to maintain it in position, and to accomplish this in a simple and effective way, I have reduced the pivot pin intermediate its ends and I have formed a resilient tongue from the end wall of the link to enter the recess in the pin and firmly retain the pin in its pivoting or operating position against being inadvertently removed therefrom. If it is desired that the pin be permanently secured in position, it is only necessary to form square shoulders on the end walls of its reduced portion which will be engaged by the edges of the tongue and positively prevent the removal of the pin after having been positioned to pivotally connect the links together, and the following is a detailed description of the present embodiment of my invention and showing one construction of links and pivot pin by means of which these advantageous results may be accomplished.

With reference to the drawings, 10 designates the links of the bracelet or chain which are pivotally connected together in series. The links herein shown are constructed in box shape each having a top wall 11, side walls 9, and an end wall 13. The side walls at one end of the link, being arranged to extend beyond the top wall, form ears 12, pierced at 13' to receive the ends of the pivot pin 14. The wall 13, at the opposite end of the link is folded downwardly forming a square shoulder 15, and then in a semi-circle as at 16 with its end portion 17 extending along beneath the link. The lower edges of the side walls are each provided with inturned flanges 18 which overlie the inturned end 17 of the wall 13 to retain this folded end wall in position.

I have slit this end wall 13 as at 19, forming a resilient tongue 20 therein which is folded over and inwardly into loop shape forming a resilient or yielding tongue or member for the purpose of guiding the entering pin and retaining it when inserted.

The pivot pin 14 is preferably formed with a recess portion 21 intermediate its ends and when it is desired that this pivot pin shall be removed from operating position as a joint pin in the links, the end walls 22 of this recess are slightly beveled so that a strong endways pressure on the pin will cause the tongue 20 to ride up on this inclined portion permitting the pin to be removed, but if it should be desired to lock this pin in position, the end walls of this recess will remain square which will engage the edges of the tongue and so secure the pin permanently in position against endways removal.

The ends 23 of this pivot pin after having been guided through the eye 20 extend sufficiently beyond this folded end wall 13 to engage the ears 12, in the next adjacent link, thus pivotally connecting these links together.

In some instances where the pin is without a head or enlargement, I round the end of the pin as at 24 which rounded portion will project beyond the side wall of the link and so prevent accidental disengagement of these ears 12 from the pin even through the ears be spread slightly from excessive strains, being applied to the chain.

In other instances, if desired I may form a head 25 on one end of the pin 27 and a nut 26 may be threaded on the opposite end of the pin to retain the same in position, as illustrated in Fig. 9.

My improved means of pivotally connecting together links of a chain or bracelet is extremely simple and practical inasmuch as the pin is retained automatically when positioned in the links. This construction is also effective in its operation and by its use the cost of construction is materially reduced.

I claim:

1. In a chain structure a series of box links pivotally connected together, said links having top end and side walls, bottom members extending inwardly from said side walls, and said end wall being folded back in loop form to extend beneath said bottom members and shaped to provide a bearing for the connecting pivot pin and a resilient tongue formed from the stock of said end wall and shaped to engage the pivot pin to resist its endways movement.

2. A chain structure formed of a series of box links pivoted together, said links having top end and side walls, bottom flanges extending inwardly from said side walls, an extending portion on the end of top wall being folded back in loop shape to form said end wall with its extremity extending beneath said bottom flanges said end wall being slit to form a resilient tongue with its free end bent inwardly in loop form to grip the pivot pin inserted therein.

In testimony whereof I affix my signature.

AUGUST F. KRAEMER.